United States Patent [19]
Chang et al.

[11] 3,894,103
[45] July 8, 1975

[54] AROMATIZATION REACTIONS

[75] Inventors: Clarence D. Chang, Princeton, N.J.; Anthony J. Silvestri, Morrisville, Pa.; Robert L. Smith, Hopewell, N.J.

[73] Assignee: Mobil Oil Corporation, New York, N.Y.

[22] Filed: Aug. 9, 1973

[21] Appl. No.: 387,218

[52] U.S. Cl............. 260/668 R; 208/135; 208/141; 260/673; 260/673.5; 260/676 R; 260/682
[51] Int. Cl.............................................. C07c 1/20
[58] Field of Search......... 208/135, 141; 260/668 R, 260/449 R, 449 M, 449 L, 449.5, 671 C, 671 M, 671 R, 673, 673.5, 682; 252/455 Z

[56]   References Cited
   UNITED STATES PATENTS

| | | | |
|---|---|---|---|
| 3,728,408 | 4/1973 | Tobias | 260/668 C |
| 3,751,504 | 8/1973 | Keown et al. | 260/672 T |
| 3,751,506 | 8/1973 | Burress | 260/671 R |
| 3,755,483 | 8/1973 | Burress | 260/671 R |

*Primary Examiner*—C. Davis
*Attorney, Agent, or Firm*—Charles A. Huggett; Michael G. Gilman

[57]   ABSTRACT

In the conversion of lower aliphatic alcohols, carbonyls, ethers or analogues thereof to higher hydrocarbons by contacting such with a crystalline aluminosilicate zeolite having a constraint index of about 1 to 12 at up to about 850°F, the improvement, whereby increasing the liquid, $C_5^+$, yield, engendered by using such catalyst having a silica to alumina ratio of about 60 to 600.

7 Claims, No Drawings

AROMATIZATION REACTIONS

This invention relates to conversion of aliphatic organic compounds to aromatic hydrocarbons. It more particularly refers to such conversions where the aliphatic compound contains oxygen, sulfur, nitrogen and/or halogen constituents.

There has recently been discovered a certain novel class of crystalline aluminosilicates which have been shown to have most unusual properties. These catalysts induce profound transformations of aliphatic hydrocarbons to aromatic hydrocarbons in commercially desirable yields. Although they have unusually low alumina contents, i.e. high silica to alumina ratios, they are very active even when the silica to alumina ratio exceeds 30. The activity is surprising since the alumina in the zeolite framework is believed responsible for catalytic activity. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalyst useful in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of 10-membered rings are preferred, although excessive puckering or pore blockage may render these catalysts ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a catalyst possesses the necessary constrained access, a simple determination of the "constraint index" may be made by passing continuously a mixture of equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand mounted in a glass tube. Prior to testing, the catalyst is treated with a stream of air at 1,000°F for at least 15 minutes. The catalyst is then flushed with helium and the temperature adjusted between 550°F and 950°F to give an overall conversion between 10% and 60%. The mixture of hydrocarbons is passed at 1 liquid hourly space velocity (i.e. 1 volume of hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The constraint index is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Catalysts suitable for the present invention are those having a constraint index from 1.0 to 12.0, preferably 2.0 to 7.0.

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft 2,213,109, the entire contents of which are incorporated herein by reference.

ZSM-21 is more particularly described in U.S. application, Ser. No. 358,192, filed May 7, 1973, and now abandoned, the entire contents of which are incorporated herein by reference.

TEA mordenite is more particularly described in U.S. application Ser. No. 130,442, filed April 11, 1971, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1,000°F for 1 hour, for example, followed by base exchange with ammonium salts followed by calcination at 1,000°F in air. The presence of organic cations in the forming solution may not be absolutely essential to the formation of this type zeolite; however, the presence of these cation does appear to favor the formation of this special type of zeolite. More generally, it is desirable to activate this type catalyst by base exchange with ammonium salts followed by calcination in air at about 1,000°F for from about 15 minutes to about 24 hours.

Natural zeolites may sometimes be converted to this type zeolite catalysts by various activation procedures and other treatments such as base exchange, steaming, alumina extraction and calcination, in combinations. Natural minerals which may be so treated include ferrierite, brewsterite, stillbite, dachiardite, epistilbite, heulandite and clinoptilolite. The preferred crystalline aluminosilicates are ZSM-5, ZSM-11, ZSM-12, ZSM-21 and TEA mordenite, with ZSM-5 particularly preferred.

The catalysts of this invention may be in the hydrogen form or they may be base exchanged or impregnated to contain ammonium or metal cation complement. It is desirable to calcine the catalyst after base exchange. The metal cations that may be present include any of the cations of the metals of Groups I through VIII of the periodic table. However, in the case of Group IA metals, the cation content should in no case be so large as to effectively inactivate the catalyst. For example, a completely sodium exchanged H-ZSM-5 is not operative in the present invention.

In a preferred aspect of this invention, the catalysts hereof are selected as those having a crystal density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred catalysts of this invention are those having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1,000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

It has also recently been discovered that it is possible and practical to convert lower aliphatic compounds containing at least one hetero atom constituent, e.g. alcohol, ether, carbonyl or analogues thereof, to a predominantly hydrocarbon product having as its major organic constituent a $C_5^+$ gasoline boiling range liquid which has excellent octane number levels and is highly aromatic in nature. This process is preferably carried out at about 500° to 850°F., that is in an overlapping, but substantially lower, temperature range than hydrocarbon aromatization previously referred to using this same type catalyst. This in itself is indeed surprising since, where oxygen is one of the hetero constituents of the aliphatic reactant, steam is a major byproduct and high temperature steam has generally been believed by those skilled in the zeolite art to have a detrimental effect upon the catalytic activity of zeolitic catalysts. This would lead one to expect that under these conditions therefore, a higher temperature would be necessary to sustain catalytic activity.

It is an object of this invention to improve this process of converting hetero atom containing lower aliphatic compounds to aromatic compounds.

It is another object of this invention to provide an improved catalyst for this process.

Other and additional objects of this invention will become apparent from a consideration of this entire specification including the concluding claims hereof.

In accord with and fulfilling these objects, one aspect of this invention is based upon the discovery that if a crystalline aluminosilicate zeolite alone or in a matrix with a silica to alumina ratio of about 60 to 600 to 1 and a constraint index of about 1 to 12 is used to catalyze the conversion of alcohols, ethers, carbonyl compounds or analogues thereof, the yield of higher hydrocarbons in the $C_5^+$ range is significantly increased. It is not understood why this phenomenon should occur. Silica has generally been considered by most workers in the field of zeolite catalysis to be substantially inert while the aluminum portion of the zeolite crystal has been associated with the catalytic activity. It would therefore seem to be desirable to decrease the silica to alumina ratio in order to increase the proportion of catalytically active material in the zeolite crystal. As noted above, minimum silica to alumina ratio for this type of zeolite is less than about 25. It is therefore considered to be unexpected that increasing this silica to alumina ratio from these minimum values to values in the 60 to 600 to 1 range, preferably about 60 to 350 to 1, causes a marked increase in the $C_5^+$ (gasoline range) liquid hydrocarbon product.

The instant process operated in all respects, except catalyst composition, with exactly the same parameters as are set forth in applications Ser. Nos. 387,224, 387,223 and 387,222 filed on even date herewith respectively (Attorney's docket numbers 8253, 8271 and 8272). These are incorporated herein by reference. The catalyst is in every respect, except for silica to alumina ratio, a crystalline aluminosilicate zeolite of the type described hereinabove and in the referred to cofiled patent applications. The preferred zeolite catalysts have a crystal density in the hydrogen form of not substantially lower than about 1.6 grams per cubic centimeter. It is of course understood that other modifications in the catalyst can be incorporated without avoiding this invention.

The following Examples are submitted as illustrative of this invention and as evidence of this invention. Parts and percentages are by weight unless expressly stated to be on some other basis, and are based on hydrocarbon product.

In each of these Examples methanol was converted in contact with a ZSM-5 catalyst. The reaction temperature was nominally 700°F. The reaction pressure was atmospheric. The space velocity was 1 LHSV except for Example 4 in which case it was 1.33 LHSV. Conversion of methanol in every case except Examples 8 and 10 was over 99%. In Example 8 the conversion was almost 97%, and in Example 10, 2.2%.

TABLE

| Example No. | 1 | 2 | 3 | 4 | 5 | 6 | 7 | 8 | 9 | 10 |
|---|---|---|---|---|---|---|---|---|---|---|
| Silica/Alumina Ratio | 35 | 35 | 68 | 68 | 100 | 140 | 140 | 220 | 300 | 1300 |
| Modifying Metal | — | — | — | — | — | — | — | — | — | — |
| $C_5^+$ product liquid % | 49 | 52 | 57 | 59 | 62 | 66 | 62 | 63 | 67 | 13 |
| Aromatics content of liquid % | 77 | 79 | 66 | 69 | 67 | 54 | 57 | 53 | 29 | 0 |
| Isopentane content of liquid % | 14 | 13 | 17 | 17 | 15 | 15 | 15 | 16 | 8 | 13 |
| Total aliphatics in liquid % | 23 | 21 | 34 | 31 | 33 | 46 | 43 | 47 | 71 | 100 |

What is claimed is:

1. In the process of converting as a reactant at least one lower aliphatic organic compound containing about 1 to 8 carbon atoms and at least one hetero constituent selected from the group consisting of oxygen, sulfur, nitrogen and halogen, by contacting such with a crystalline aluminosilicate zeolite having a constraint index of about 1 to 12 and having a silica to alumina ratio of at least about 12 at about 500° to 850°F. to produce a product comprising a highly aromatic $C_5^+$ gasoline boiling range liquid having a high octane number; the improvement, whereby increasing the proportion of the product which is $C_5^+$ gasoline, which comprises utilizing as the catalyst, a zeolite as defined having a silica to alumina ratio of about 60 to 600:1 while maintaining the other operating parameters of the process.

2. The improved process claimed in claim 1 wherein said reactant comprises methanol.

3. The improved process claimed in claim 1 wherein said catalyst comprises H-ZSM-5.

4. The improved process claimed in claim 1 wherein said catalyst comprises H-ZSM-5 in an alumina matrix.

5. The improved process claimed in claim 1 carried out at about 650° to 750°F.

6. The improved process claimed in claim 1 wherein said zeolite catalyst has a silica to alumina ratio of about 60 to 350.

7. The improved process claimed in claim 1 wherein said zeolite has a crystal density in the hydrogen form of not substantially below about 1.6 grams per cubic centimeter.

* * * * *